United States Patent
Quigg Brown et al.

(10) Patent No.: US 8,645,314 B2
(45) Date of Patent: Feb. 4, 2014

(54) APPARATUS, SYSTEM, AND METHOD FOR COMMUNICATING INTERACTIVE FORMS AND REPORTS IN MESSAGING APPLICATIONS

(75) Inventors: Deanna Lynn Quigg Brown, Queen Creek, AZ (US); Dinesh Chandra Coca, San Francisco, CA (US); Louis Daniel Echevarria, Tucson, AZ (US); Melissa Jorgette Garcia, Tucson, AZ (US); Andrew Gary Hourselt, Tucson, AZ (US); Elena Schneider, Austin, TX (US); Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 12/047,182

(22) Filed: Mar. 12, 2008

(65) Prior Publication Data
US 2009/0235275 A1    Sep. 17, 2009

(51) Int. Cl.
    G06F 7/00    (2006.01)
    G06F 17/00   (2006.01)

(52) U.S. Cl.
    USPC .......................................................... 707/602

(58) Field of Classification Search
    None
    See application file for complete search history.

(56) References Cited

U.S. PATENT DOCUMENTS

| | | | |
|---|---|---|---|
| 6,965,926 B1 | 11/2005 | Shapiro, Jr. et al. | |
| 7,266,776 B2 * | 9/2007 | Quillen et al. | 715/758 |
| 2003/0023679 A1 * | 1/2003 | Johnson et al. | 709/204 |
| 2004/0162877 A1 * | 8/2004 | Van Dok et al. | 709/204 |
| 2004/0205133 A1 | 10/2004 | Adler | |
| 2005/0198124 A1 | 9/2005 | McCarthy | |
| 2006/0195781 A1 | 8/2006 | Jatavallabha et al. | |
| 2007/0011258 A1 | 1/2007 | Khoo | |
| 2007/0118598 A1 * | 5/2007 | Bedi et al. | 709/204 |
| 2007/0271085 A1 * | 11/2007 | Hamdi et al. | 703/27 |
| 2008/0034040 A1 * | 2/2008 | Wherry et al. | 709/204 |
| 2009/0089654 A1 * | 4/2009 | Wittig et al. | 715/223 |

OTHER PUBLICATIONS

Chande, Suresh, "Form based Structured Mobile Messaging Framework for Mobilizing Business Applications," IEEE, 2006.*

Nathaniel S. Borenstein, Computational Mail a Network Infrastructure for Computer-Supported Cooperative Work, CSCW 92 Proceedings, Nov. 1992, pp. 67-74.

Victoria Bellotti et al., Innovation in Extremis: Evolving an Application for the Critical Work of Email and Information Management, Proceedings of the Conference on Designing Interactive Systems: Process, Practices, Methods, and Techniques DIS' 02, Jun. 2002, pp. 181-192.

* cited by examiner

*Primary Examiner* — Taelor Kim
(74) *Attorney, Agent, or Firm* — Kunzler Law Group (57) ABSTRACT

An apparatus, system, and method are disclosed for communicating interactive forms and reports in messaging applications. The apparatus for communicating interactive forms and reports in messaging applications is provided with a plurality of modules configured to functionally execute the necessary steps of selecting a markup language instruction, copying the markup language instruction and post the markup language instruction into a clipboard as a markup language object, pasting the markup language object into a data entry field associated with a messaging application, and injecting the markup language object into a message transmission to a second messaging application. These modules in the described embodiments include a selection module, a copy module, a paste module, and an injection module.

7 Claims, 6 Drawing Sheets

APPARATUS, SYSTEM, AND METHOD FOR COMMUNICATING INTERACTIVE FORMS AND REPORTS IN MESSAGING APPLICATIONS

BACKGROUND OF THE INVENTION

1. Field of the Invention

This invention relates to instant messaging and more particularly relates to communicating interactive forms and reports in messaging applications.

2. Description of the Related Art

Current messaging applications communications of conversational text between two users at remote locations. Commonly such communications are called "chat." Messaging applications may be stand-alone or embedded within other application such as email applications. Messaging applications provide a real-time alternative to email communications. Messaging applications are commonly used for social interactions and communications as well as for business related communications.

Certain messaging applications include file transfer functions. To transfer a file, a user typically drags a file icon into a data entry field. The messaging application may then transmit the file to a party with whom the user of the messaging application is connected. The remote party typically receives the file as indicated by a displayed icon in the messaging application. When the remote user clicks on the icon, the application associated with that file opens the file in a new window. Common messaging devices do not include functions for viewing the file within the messaging application.

Businesses commonly use messaging applications for real time team communications, reporting of technical problems, and customer service. For example, corporate web pages often include a messaging function that allows a customer or web page visitor to communicate directly with a customer service representative without having to call on the telephone. However, common messaging services and applications only provide for text communications and file transfer, but do not provide for interactive displaying and control of interactive markup language forms within the messaging application. Common applications require separate applications and viewing windows for displaying interactive forms, reports, web pages, and applications.

SUMMARY OF THE INVENTION

The present invention has been developed in response to the present state of the art, and in particular, in response to the problems and needs in the art that have not yet been fully solved by currently available instant messaging applications. Accordingly, the present invention has been developed to provide an apparatus, system, and method for communicating interactive forms and reports in messaging applications that overcome many or all of the above-discussed shortcomings in the art.

The apparatus for communicating interactive forms and reports in messaging applications is provided with a plurality of modules configured to functionally execute the necessary steps of selecting a markup language instruction, copying the markup language instruction and post the markup language instruction into a clipboard as a markup language object, pasting the markup language object into a data entry field associated with a messaging application, and injecting the markup language object into a message transmission to a second messaging application. These modules in the described embodiments include a selection module, a copy module a paste module, and an injection module.

In a further embodiment, the markup language instruction may include an interactive markup language form. The selection module includes a World Wide Web (WWW) compatible application plug-in configured to identify a source of the markup language instruction. In a certain embodiment, the copy module may include a conversion module configured to convert the markup language instruction into a markup language object.

In another embodiment, the apparatus includes a receiver module configured to receive a message transmission from a first messaging application. In such an embodiment, the apparatus may include a markup language rendering module configured to render a markup language object into a markup language form. Additionally, such an embodiment may include a display module configured to display the markup language form in a messaging window associated with a second messaging application.

In this embodiment, the markup language rendering module may also render the markup language object into an interactive markup language form, wherein the recipient of the interactive markup language form may interact with the interactive markup language form as though it were an interactive web page. The interactive markup language form may also include an interactive control displayed within the viewing window of the second messaging application, wherein the interactive control is configured to receive indicia from a user of the remote messaging application.

A system of the present invention is also presented for communicating interactive forms and reports in messaging applications. In one embodiment, the system may include a first messaging application and a second messaging application. The first messaging application may select a markup language instruction, copy the markup language instruction and post the markup language instruction into a clipboard as a markup language object, paste the markup language object into a data entry field associated with a messaging application, and inject the markup language object into a message transmission to the second messaging application. The second messaging application may receive the message transmission from the first messaging application, render a markup language object into a markup language form, and display the markup language form in a messaging window associated with the second messaging application.

A method of the present invention is also presented for communicating interactive forms and reports in messaging applications. The method in the disclosed embodiments substantially includes the steps necessary to carry out the functions presented above with respect to the operation of the described apparatus and system. In one embodiment, the method includes selecting a markup language instruction, copying the markup language instruction and pasting the markup language instruction into a clipboard as a markup language object, pasting the markup language object into a data entry field associated with a messaging application, and injecting the markup language object into a message transmission to a second messaging application.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
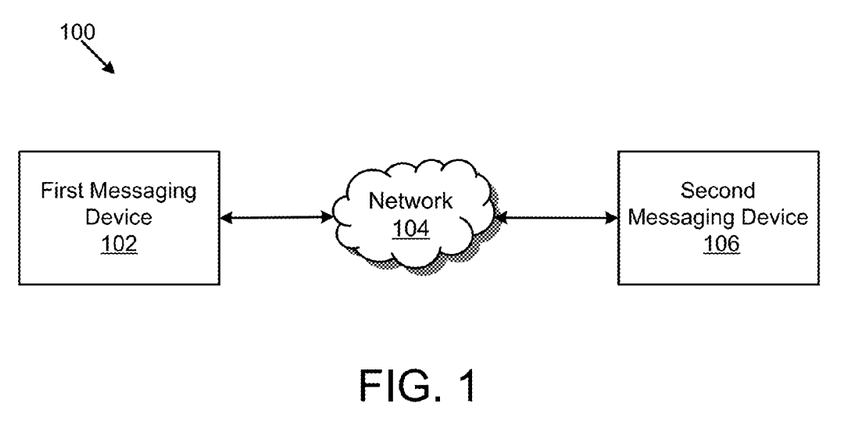
FIG. 1 is a schematic block diagram illustrating one embodiment of a system for communicating interactive forms and reports in messaging applications.

FIG. 1 illustrates one embodiment of a system 100 for communicating interactive forms and reports in messaging applications. In one embodiment, the system 100 may include a first messaging device 102 and a second messaging device 106 separated by a network 104. Further embodiments of the system may include additional messaging devices (not shown) configured for group chat, monitored chat, or the like.

The first messaging device 102 may select a markup language instruction. For example, the markup language instruction may include HyperText Markup Language (HTML) code. In a further embodiment, the first messaging device 102 may copy the markup language instruction and post the markup language instruction into a clipboard as a markup language object. The first messaging device 102 may then paste the markup language object into a data entry field associated with a messaging application hosted by the first messaging device 102 and inject the markup language object into a message transmission to the second messaging device 106.

In a specific embodiment, the first messaging device 102 may include a desktop workstation or a portable computing device such as a laptop or Personal Digital Assistant (PDA). The first messaging device 102 may include a computer readable storage device, such as a hard drive. The computer readable storage device may include computer readable instructions comprising a first messaging application. The first messaging device 102 may host the first messaging application. A display associated with the first messaging device 102 may display a web based messaging window associated with the first messaging application.

The second messaging device 106 may receive the message transmission from the first messaging device 102 through the network 104, render the markup language object into a markup language form, and display the markup language form in a messaging window associated with the second messaging device 106. The second messaging device 106 may include similar physical features to that of the first messaging device 102. Specifically, the second messaging device 106 may include a processing device, a storage device, a display device and one or more user interface controls.

In a particular embodiment, the first and/or the second messaging applications may include a web based instant messaging application. In such an embodiment, the instant messaging application may include computer readable markup language instructions configured to display a Graphical User Interface (GUI) for communicating messages to a user and for obtaining message data from a user.

The network 104 may include the World Wide Web (WWW) otherwise known as the internet. It may also include a Local Area Network (LAN) or a private Wide Area Network (WAN). The network 104 may include one or more data routing or switching devices such as internet routers, data switches, hubs, wireless communication devices, and the like.

Figure 2:
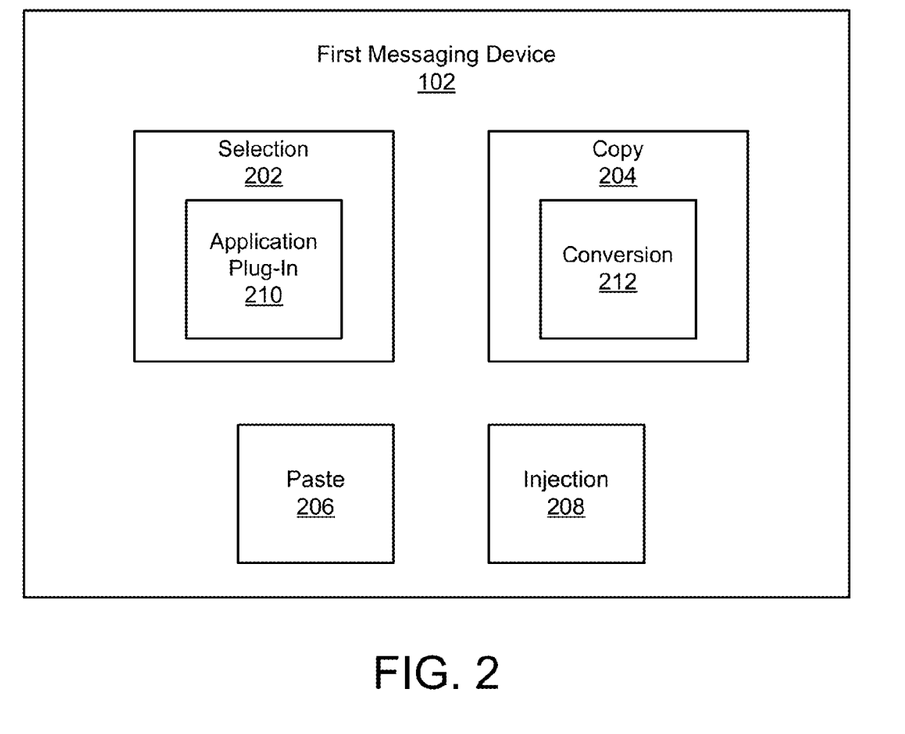
FIG. 2 is a schematic block diagram illustrating one embodiment of an apparatus for communicating interactive forms and reports in messaging applications.

FIG. 2 illustrates one embodiment of an apparatus for communicating interactive forms and reports in messaging applications. In the depicted embodiment, the apparatus is the first messaging device 102. In one embodiment, the first messaging device 102 may include a selection module 202 a copy module 204, a paste module 206, and an injection module 208. In a further embodiment, the selection module 210 may include an application plug-in 210. Additionally, the copy module 204 may include a conversion module 212.

In one embodiment, the selection module 202 is configured to select a markup language instruction. For example, the selection module 202 may include a mouse, a keyboard, or other user input device. The selection module 202 may additionally include a set of computer program instructions configured to interpret user input to select a segment of markup language code, a markup language file, or the like. For example, in one embodiment, a user may use a mouse control to point to an interactive markup language form. Then, upon receiving a selection event, such as a mouse click, the selection module 202 may select the interactive markup language form for further action.

In one embodiment, the selection module 202 may include an application plug-in 210. For example, the selection module 202 may include a web browser plug in configured to display one or more user controls. The user controls may be used to activate the selection module 202. In a further embodiment, the application plug-in 210 may facilitate operation of the copy module 204, the paste module 206, and the injection module 208 as described below.

The copy module 204 may then copy the selected markup language instruction. In a further embodiment, the copy module 204 may post the markup language instruction into a clipboard. In a certain embodiment, the copy module 204 may post the markup language instruction as a markup language object. As used herein, the term "markup language object" includes a markup language element or group of markup language elements that include sufficient formatting and content to be rendered and displayed by a markup language rendering engine independently.

In a further embodiment, the copy module 204 may include a conversion module 212. The conversion module 212 may convert a markup language instruction into a markup language object. For example, the conversion module 212 may include a set of automated instructions, such as a macro, configured to analyze the markup language instruction and add sufficient formatting or content instructions to convert the markup language instruction into a markup language object. The instructions for the automated conversion process may be stored on a storage medium such as a hard disk. The conversion module 212 may operate automatically in response to detecting a copy command. In an alternative embodiment, the conversion module 212 may only operate when activated by a user operated control such as a button, a hyperlink, or the like.

The paste module 206 may obtain the markup language object from the clipboard and paste it into a data entry field associated with the first messaging application. For example, the paste module 206 may paste the markup language object from the clipboard to a text or object entry field in an instant messaging user interface in response to a user instruction. In one embodiment, the user may enter a paste command after selecting the data entry field with a mouse pointer, or the like. The paste module 206 may paste the markup language object in response to the paste command. In one embodiment, the paste module 206 includes a standard paste feature of a common messaging application.

The injection module 208 may then inject the markup language object into a message transmission to the second messaging device 106. In a particular embodiment, the injection module 208 may inject the markup language object in response to an instruction from a user. For example, the user may click on a send button. The injection module 208 may package the markup language object into one or more data transmission packets, and transmit the data transmission packets over the network 104 to the second messaging device 106 in response to the send command.

Figure 3:
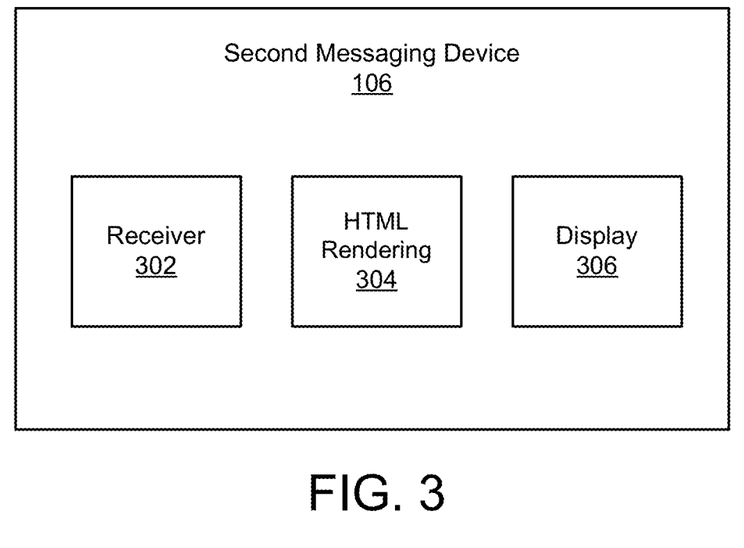
FIG. 3 is a schematic block diagram illustrating another embodiment of a apparatus for communicating interactive forms and reports in messaging applications.

FIG. 3 illustrates another embodiment of an apparatus for communicating interactive forms and reports in messaging applications. In the depicted embodiment, the apparatus is the second messaging device 106. The second messaging device 106 may include a receiver module 302, a markup language rendering module 304, and a display module 306.

In one embodiment, the receiver module 302 may include an Ethernet or wireless network card. The receiver module 302 may be configured to receive one or more message transmissions from the first messaging device 102. In a further embodiment, the receiver module 302 may receive the message transmissions via the network 104. The receiver module 302 may additionally include a message buffer, cache or memory. In a further embodiment, the receiver module 302 may include an Application Program Interface (API) configured to provide an interface between the second messaging application hosted by the second messaging device 106 and the hardware receiver components on the second messaging device 106.

The markup language rendering module 304 may render the markup language object received by the receiver module 304 into a markup language form. In a further embodiment, the markup language form may be an interactive form, report, web page, web service, or the like. In one embodiment, the markup language rendering module 304 includes a markup language rendering engine implemented in software. One of ordinary skill in the art may recognize several possible implementations of a markup language rendering engine. Certain messaging applications include markup language rendering engines. One embodiment of a messaging application that includes a markup language rendering engine is alphaWorks™ NotesBuddy™ available from International Business Machines (IBM®).

The display module 306 may display the markup language form in a messaging window associated with the second messaging application hosted by the second messaging device 106. Further embodiments of a messaging application, and its associated display are described below with reference to FIG. 4.

Figure 4:
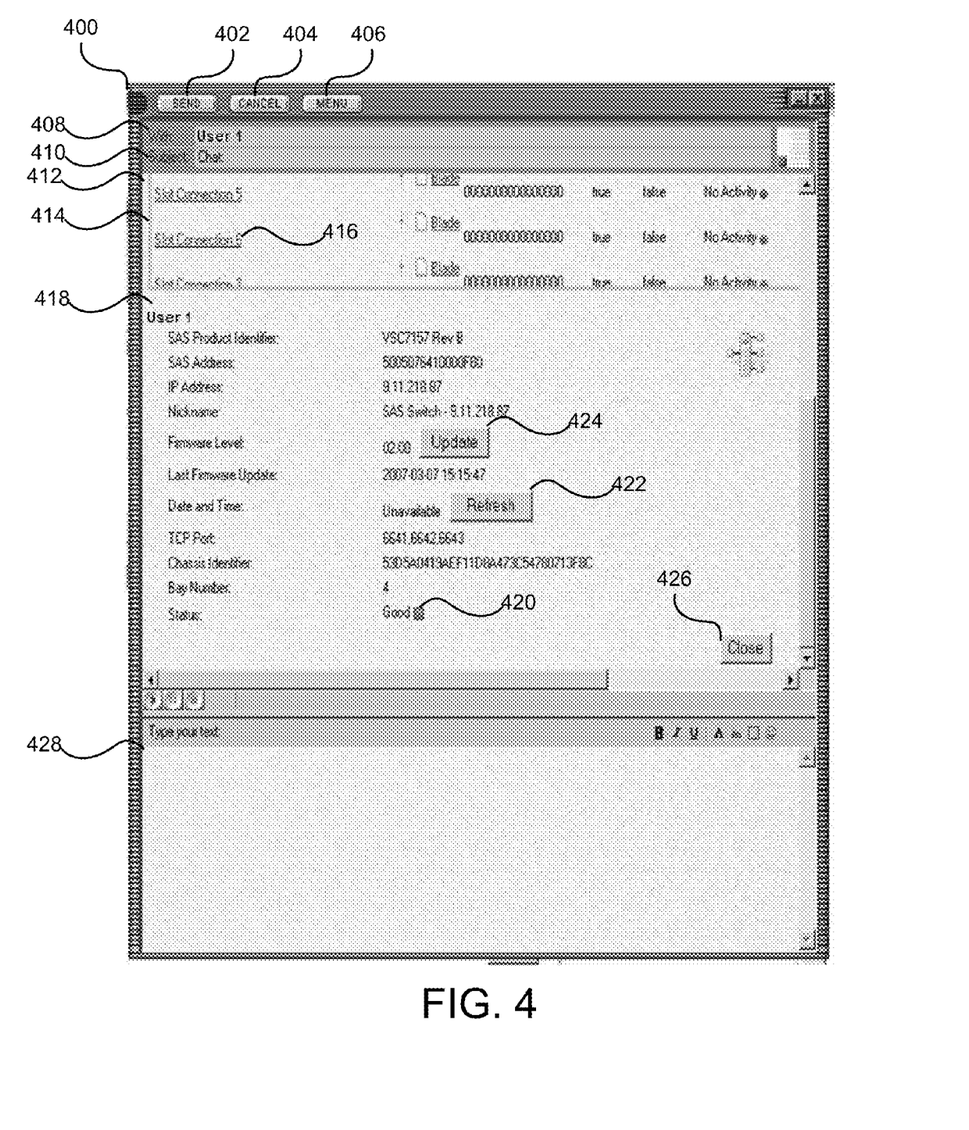
FIG. 4 is a screen-shot view of one embodiment of a messaging application displaying an interactive markup language form.

FIG. 4 illustrates on embodiment of a messaging application 400. In the depicted embodiment, the messaging application appears in a window. The window may include a web browser window, or the like. The messaging application 400 may include one or more user controls 402-406. For example, the messaging application 400 may include a send button 402, a cancel button 404 and a menu button 406. The messaging application 400 may also include a display 408, 410. The display 408, 410 may include a user display 408 configured to display a user name associated with the user of the messaging application 400. Alternatively, the user display 408 may display a user name of a remote user with whom the local user is connected. The display 408, 410 may also include a subject display 410 configured to display the type of connection. For example, the subject display 410, in the depicted embodiment, indicates that a chat connection has been established.

The messaging application 400 may also include a message display field 412. In one embodiment, the message display field 412 displays messages received from another messaging application 400. The message display field 412 may also display messages that have been transmitted to another messaging application 400. In a further embodiment, the message display field 412 may display a markup language object such as a markup language form, report, web page, or web service. In a particular embodiment, the markup language object displayed by the message display window 412 may include an interactive markup language form 414, 418.

In the depicted embodiment, the message display field 412 is displaying two separate interactive markup language forms 414, 418. The first interactive markup language form 414 includes one or more hyperlinks 416 associated with information regarding a device monitored by a device monitoring application. In this example, the interactive form 414 provides the message recipient with information regarding the status of the monitored device as well as an interactive option to view additional details about one of the monitored devices. In such an embodiment, a user of the messaging application 400 may receive the first interactive form 414, click on the hyperlink 416 and a second interactive form 418 may be displayed in the message display field 412.

The second interactive form 418 may also be a markup language form. In one embodiment, the second interactive form 418 includes detailed information about the monitored device including a status indicator 420. The second interactive form 418 may also include one or more interactive controls 422-426. For example, the interactive controls 422-426 may include a refresh button 422, an update button 424, and a close button 426. These buttons 422-426 may be embedded within the markup language object comprising the interactive form and provide some indicia of further actions to be performed by the interactive markup language form, or by an application associated with the interactive markup language form. Other interactive controls may include text entry boxes, drop-down selection boxes, radio buttons, check boxes, list boxes, and the like. In such an embodiment, a user may interact with the second interactive form 418 directly within the message display field 412 without having to switch to another window.

In a further embodiment, the messaging application 400 includes a data entry field 428. The data entry field 428 may include a text entry field. Additionally, the paste module 206 may paste a markup language object into the data entry field 428. A user may then press the send button 402 and the markup language object may be transmitted to a second messaging application 400. When the second messaging application 400 receives the markup language object, the markup language rendering module 304 may render the markup language object into an interactive markup language form like the second form 418. The display module 306 may then display the interactive markup language form in the massage display field 412.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
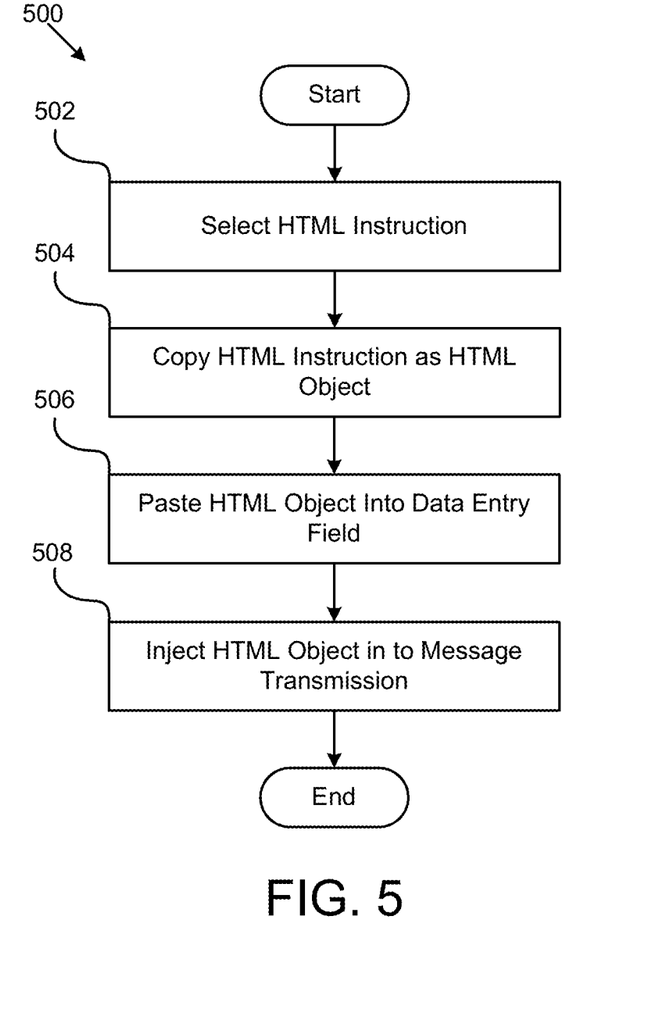
FIG. 5 is a schematic flow chart diagram illustrating one embodiment of a method for communicating interactive forms and reports in messaging applications.

FIG. 5 illustrates one embodiment of a method 500 for communicating interactive forms 418 and reports in messaging applications 400. In one embodiment, the method 500 starts when the selection module 202 selects 502 a markup language instruction. The copy module 204 may then copy 504 the markup language instruction to a clipboard as a markup language object. The paste module 206 may paste 506 the markup language object into a data entry field 428 the first instant messaging application 400 hosted by the first messaging device 102. The injection module 208 may then inject 508 the markup language object into a message transmission to a second messaging application hosted by the second messaging device 106 and the method 500 ends. In a further embodiment, the first messaging device 102 may communicate the message transmission to the second messaging device 106 through the network 104.

Figure 6:
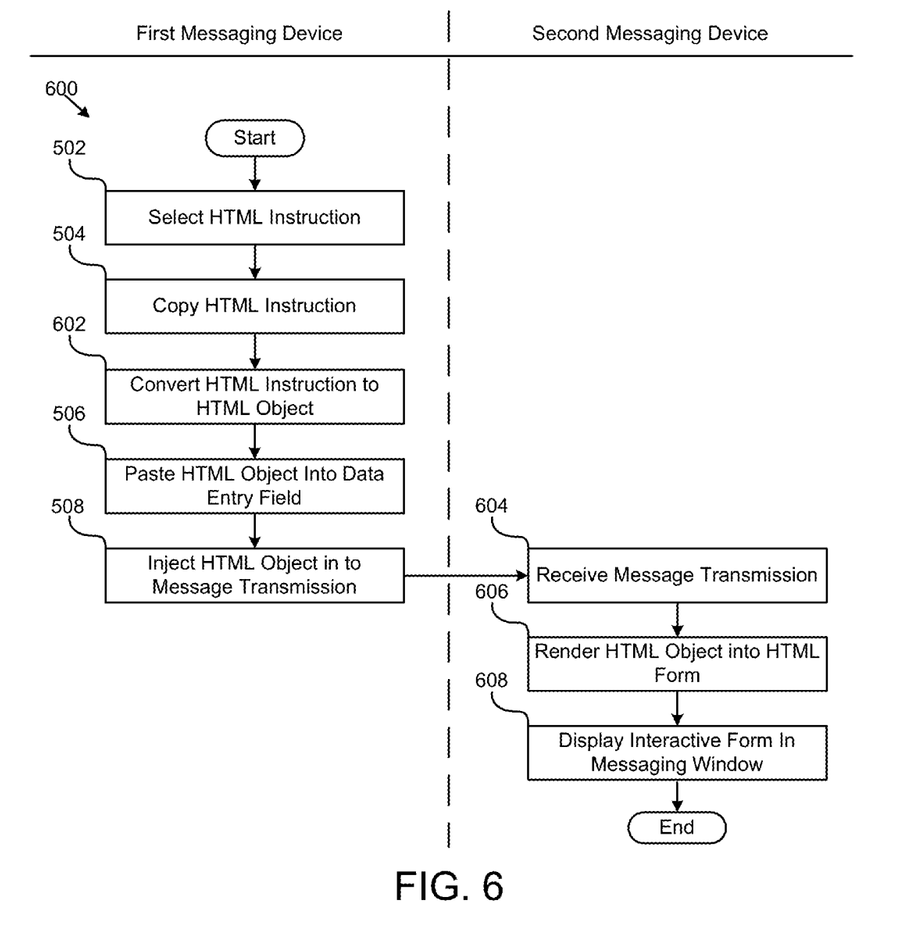
FIG. 6 is a detailed schematic flow chart diagram illustrating one embodiment of a method for communicating interactive forms and reports in messaging applications.

FIG. 6 illustrates another embodiment of a method 600 for communicating interactive forms 418 and reports in messaging applications 400. In one embodiment, the method 600 includes steps performed by both the first messaging device 102 and the second messaging device 106. In such an embodiment, the method 600 starts when the selection module 202 of the first messaging device selects 502 a markup language instruction. The copy module 204 may then copy 504 the markup language instruction to a clipboard as a markup language object. In the depicted embodiment, the conversion module 212 may then convert 602 the markup language instruction into a markup language object before the copy module 204 places the markup language object on the clipboard. The paste module 206 may paste 506 the markup language object into a data entry field 428 the first instant messaging application 400 hosted by the first messaging device 102. The injection module 208 may then inject 508 the markup language object into a message transmission to a second messaging application hosted by the second messaging device 106.

The receiver module 302 of the second messaging device 106 may subsequently receive 604 the message transmission from the first messaging device 102. The markup language rendering module 304 may then render 606 the markup language object received with the message transmission into a markup language form 418. The display module 306 may then display 608 the markup language form in the messaging window 400 and the method ends.

In a particular embodiment, the messaging window 400 is associated with the second messaging application hosted by the second messaging device 106. In a further embodiment, the first messaging device 102 and the second messaging device 106 may establish a full-duplex communication connection, wherein the devices 102, 106 both send and receive message transmissions. In such an embodiment, the first messaging device 102 may include the receiver module 302, the markup language rendering module 304, and the display module 306 in addition to the modules depicted in FIG. 2. Similarly, the second messaging device 106 may include both sets of modules 202-212, 302-306.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising computer-readable storage media for communicating interactive forms and reports in instant messaging applications, the apparatus comprising:
    a processor communicatively connected to the computer-readable storage media;
    a selection module configured to select an interactive hypertext markup language (HTML) form, the interactive HTML form comprising a plurality of fields into which a recipient can input information about a monitored device monitored by a device monitoring application and hyperlinks displaying configuration and link details of the monitored device;
    a copy module configured to copy the interactive HTML form and post the interactive HTML form into a clipboard as a HTML object, wherein the HTML object comprises one or more HTML elements renderable by a HTML rendering engine;
    a paste module configured to automatically paste the HTML object into a data entry field of a first chat instant messaging application;
    and an injection module configured to inject the HTML object into a message transmission to a second chat instant messaging application such that the interactive HTML form is displayed in a message display field of the second chat instant messaging application that displays messages received from other chat instant messaging applications, allowing the recipient using the second chat instant messaging application to enter the input information about the monitored device and receive the configuration and link details of the monitored device in the plurality of fields in the message display field of the second chat instant messaging application;
    wherein the recipient of the interactive HTML form may interact with the interactive HTML form as an interactive web page;
    wherein the interactive HTML form further comprises an interactive control displayed within a messaging window of the second chat instant messaging application, wherein the interactive control is configured to receive indicia of further actions to be performed by the interactive HTML form from a user of the first chat instant messaging application;
    wherein the interactive control comprises an update and refresh information control;
    a display module configured to display the interactive HTML form in a message display field of the second chat instant messaging application, and further configured to receive the input information about the monitored device and receive the configuration and link details of the monitored device in the plurality of fields in the message display of the second chat instant messaging application;
    and wherein the transmission of the interactive HTML form using the first chat instant messaging application and second chat instant messaging application is performed during a single open chat session.

2. The apparatus of claim 1, wherein the selection module further comprises a World Wide Web (WWW) compatible application plug-in configured to identify a source of the HTML instruction.

3. The apparatus of claim 1, wherein the copy module further comprises a conversion module configured to convert the interactive HTML form into a HTML object.

4. A computer program product comprising a non-transitory computer readable medium having computer usable program code executable to perform operations for communicating interactive forms and reports in chat instant messaging applications,
    the operations of the computer program product comprising:
    selecting an interactive hypertext markup language (HTML) form, the interactive HTML form comprising a plurality of fields into which a recipient can input information about a monitored device monitored by a device monitoring application and hyperlinks displaying configuration and link details of the monitored device;
    copying the interactive HTML form and post the interactive HTML form into a clipboard as a HTML object, wherein the HTML object comprises one or more HTML elements renderable by a HTML rendering engine;
    automatically pasting the HTML object into a data entry field of a first chat instant messaging application;
    injecting the HTML object into a message transmission to a second chat instant messaging application such that the interactive HTML form is displayed in a message display field of the second chat instant messaging application that displays messages received from other chat instant messaging applications, allowing the recipient using the second chat instant messaging application to enter the input information about the monitored device and receive the configuration and link details of the monitored device in the plurality of fields in the message display field of the second chat instant messaging application;
    wherein the recipient of the interactive HTML form may interact with the interactive HTML form as an interactive web page;
    wherein the interactive HTML form further comprises an interactive control displayed within a messaging window of the second chat instant messaging application, wherein the interactive control is configured to receive indicia of further actions to be performed by the interactive HTML form from a user of the first chat instant messaging application;
wherein the interactive control comprises an update and refresh information control;
wherein the interactive control comprises an update information selector;
displaying the interactive HTML form in a message display field of the second chat instant messaging application, and further configured to receive the input information about the monitored device and receive the configuration and link details of the monitored device in the plurality of fields in the message display of the second chat instant messaging application;
and wherein the transmission of the interactive HTML form using the first chat instant messaging application and second chat instant messaging application is performed during a single open chat session.

5. The computer program product of claim 4, further comprising a World Wide Web (WWW) compatible application plug-in configured to identify a source of the HTML instruction.

6. The computer program product of claim 4, wherein copying further comprises converting the interactive HTML form into a HTML object.

7. The computer program product of claim 4, wherein the operations further comprise: receiving the message transmission from the first chat instant messaging application;
and rendering the HTML object into the interactive HTML form.

* * * * *